Jan. 1, 1952  M. R. THORBURN  2,581,219
THICKNESS GAUGE

Filed Oct. 26, 1949  2 SHEETS—SHEET 1

INVENTOR
MILTON R. THORBURN
BY
Louis F. Gagnon
ATTORNEY

Jan. 1, 1952  M. R. THORBURN  2,581,219
THICKNESS GAUGE
Filed Oct. 26, 1949  2 SHEETS—SHEET 2

INVENTOR
MILTON R. THORBURN
BY
Louis L. Gagnon
ATTORNEY

Patented Jan. 1, 1952

2,581,219

UNITED STATES PATENT OFFICE 2,581,219

THICKNESS GAUGE

Milton R. Thorburn, Sturbridge, Mass., assignor to American Optical Company, Southbridge, Mass., a voluntary association of Massachusetts Application October 26, 1949, Serial No. 123,578

8 Claims. (Cl. 33—148)

This invention relates to gauges and has particular reference to gauges of the type used for measuring the thickness of articles such as ophthalmic lenses.

An important object of this invention is to provide a gauge for measuring the thickness of articles such as ophthalmic lenses and embodying means for measuring an article at predetermined distances from the optical center or other predetermined point thereof either during the process of forming a surface on the article while the article is being suitably supported on a conventional block or the like or after removal of the article from the supporting means.

Another object is to provide an attachment for use with conventional lens thickness gauges for controlling the positions of the gauging points thereof with respect to the optical center or other predetermined point of a lens being measured.

Another object is to provide a lens thickness gauge with a centering device embodying an arm extending forwardly of the gauging points and having a transparent member at the end thereof and spaced a predetermined distance from the gauging points, which transparent member is provided with one or more reference marks adapted to be aligned with a reference mark indicating the optical center or other predetermined point of the lens being measured whereby the distance from said predetermined point to the point of engagement by the gauging points is controlled.

Another object is to provide a lens thickness measuring gauge of the above character which is simple in construction, efficient in operation, and comparatively economical to manufacture.

Other objects and advantages of the invention will become apparent from the following description taken in connection with the accompanying drawings in which.

In the manufacture of articles such as ophthalmic lenses, particularly when forming the second or final surface on the lens, it is of extreme importance to check the optical relation to which said second surface is being formed relative to the first in order to insure that the said surfaces will be in proper perspective relation when the lens is reduced to final thickness.

It is of further importance to be able to check the completed lens to determine whether or not it has the proper corrective characteristics.

One of the most common methods of measuring is to gauge the thickness of the lens at given selected locations, preferably at diametrically opposed points adjacent the periphery of the lens and in the major meridians thereof during the abrading of the final surface. These various gauge points should be at a given distance from the optical or other predetermined center point on the lens. With most prior art gauges there is no provision for determining the accurate location of the gauge points and considerable error, due to this defect, was found to exist in the past. Such inaccuracies were of particular concern when forming the final surface on bifocal lenses of the type having a segment field whose position must be predetermined with respect to a point on the lens through which the line of straight ahead vision extends when the lens is in proper position before the eyes of the wearer, and more particularly in cases where a prism correction is required, for in such instances the points of gauging must be at a fixed distance from said center point in order to insure that the proper final prism correction exists when the lens is completed.

The present invention accomplishes this by providing an attachment for conventional lens thickness gauges, which attachment embodies a member alignable with the optical center of a lens or other predetermined point thereon, the member being maintained at a predetermined distance from the gauging points of the particular gauge used.

Figure 1:
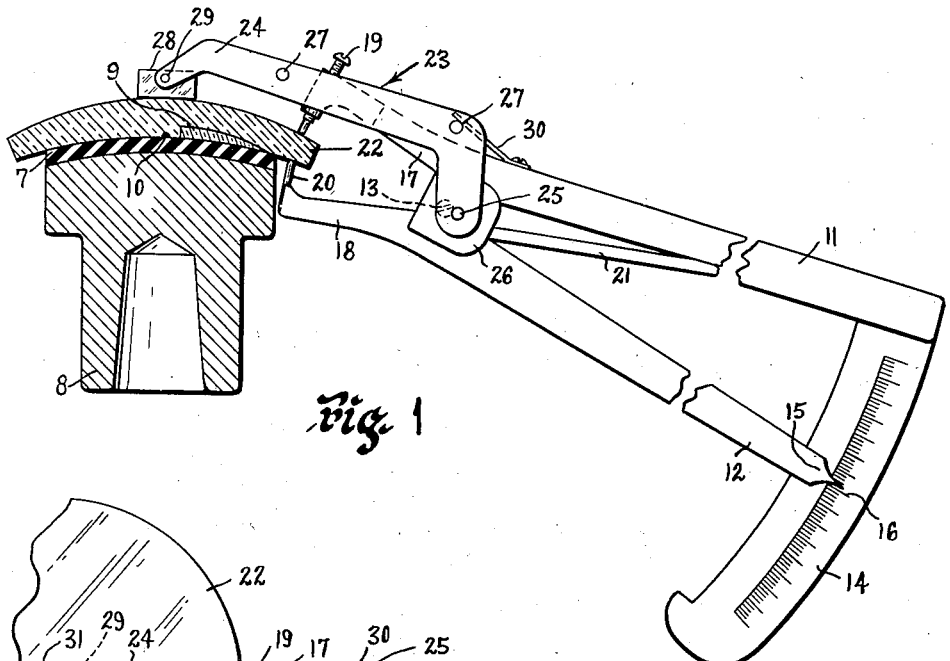
Fig. 1 is a side elevational view of a caliper type gauge embodying the invention and indicating one of its uses.

Referring to the drawings wherein like characters of reference designate like parts throughout the several views, Fig. 1 illustrates a conventional caliper type gauge for measuring a lens 22 which is conventionally attached as by a layer of pitch 7 or other adhesive to a block 8. The block 8 is of conventional type shaped for attachment to a machine for generating a surface on the lens 22. The lens 22 is shown as having a bifocal segment 9 in its finished surface, which surface is directed toward the block 8, and is also provided with a reference mark 10 on its finished surface indicating the optical center or other predetermined point of the lens to be used as a center for measuring purposes. The gauge is comprised of a pair of spaced arms 11 and 12 which are hinged at 13 for movement toward one another. One end of the arm 11 is provided with an arcuate graduated indicating plate 14 with the adjacent end of the arm 12 being provided with a pointed portion 15 which is adapted to be aligned with graduations 16 on the plate 14 as the arms 11 and 12 are moved toward and away from one another. The opposed end portions 17 and 18 of the arms 11 and 12 are provided with gauging points 19 and 20 respectively. One of the gauging points, preferably the upper gauging point 19, is threadedly located in the end portion 17, for adjustment toward and away from the opposed gauging point 20.

A suitable spring device such as tension arm 21 is used to normally maintain the arms 11 and 12 in spaced relation, whereby upon manual movement of the arms 11 and 12 toward one another, the end portions 17 and 18 will be spaced to permit insertion of a lens 22 or similar article between the gauging points 19 and 20, and upon release of pressure on the arms 11 and 12 the spring arm 21 will cause the end portions 17 and 18 to move toward one another whereupon the gauging points 19 and 20 will engage the opposed side surfaces of the lens 22. When the gauging points 19 and 20 are thus in engagement with the lens, a reading of the graduations 16 as indicated by the pointed portion 15 on arm 12 will indicate the thickness of the lens at the point of engagement by the gauging points 19 and 20.

It is evident, however, that with the above construction a lens may be inserted between the gauging points 19 and 20 to varying extents when making repeated measurements, and it is difficult to consistently position the gauging points repeatedly at the proper distance from the predetermined center 10 of the lens so that accurate measurements may be made.

Therefore, there is provided a pivoted member 23 which comprises a pair of spaced arms 24, one on each side of the arm 11, and pivoted at 25 to a suitable portion of the gauge such as the hinge members 26. The spaced arms 24 extend longitudinally of the end portion 17 beyond the gauging point 19 and are connected together by spacing pins or studs 27. Carried by the outer ends of the arms 24 is a transparent alignment member 28 preferably in the form of a block of glass, plastic or similar transparent material. The inner surface of each arm is provided with a short projection 29 which is adapted to be positioned in a shallow recess provided therefor in the opposed sides of the member 28, and the member 28 is thus permitted pivotal movement whereby it can be made to engage the adjacent surface of the lens 22.

A leaf spring 30 connected to the arm 11 is shaped to have a portion engaging the adjacent stud 27 for exerting pressure upon the member 23 to constantly urge it downward and maintain the aligning member 28 in engagement with the lens surface.

Figure 2:
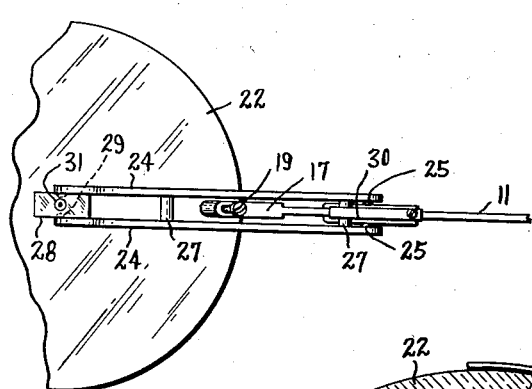
Fig. 2 is a fragmentary top plan view of the device shown in Fig. 1.

The transparent aligning member 28 is provided on its bottom surface with one or more reference marks 31 (Fig. 2) which may be in the form of bull's-eyes, cross hairs, dots or similar characters and in use are adapted to be superimposed over the reference mark 10 on the lens indicating the optical center thereof or other predetermined point to be used as a center. It is important to note that the distance between the reference mark 31 and the end of the gauging point 19 is controlled and will indicate the distance from the predetermined center 10 of the lens to the points at which the thickness measurements are to be taken.

In using a device of this character, a lens 22 is positioned between the spaced gauging points 19 and 20 preferably along one of the major meridians thereof with the reference mark 31 of the aligning member 28 aligned with and superimposed upon the predetermined center 10 which has been previously marked on the lens. Upon permitting the gauging points to engage the lens surfaces, a reading can be taken from the scale 16 indicating the thickness of the lens at the point of engagement by the gauging points 19 and 20. Then, by turning the lens about its predetermined center 10, another point thereon, at the same distance from the center 10 and substantially diametrically opposite the first gauge point can be measured. Similar measurements are made in the other major meridian of the lens and by these measurements the thickness of the lens can be accurately controlled during the formation of the final curved surface. Also, by positioning the completed lens in the device and measuring the thickness in various meridians, the amount of prism in the finished lens can be checked.

Figure 6:
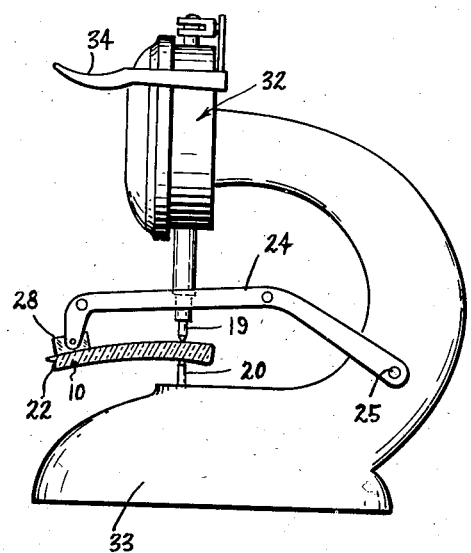
Fig. 6 is a front elevational view of a bench type gauge embodying the invention.

A bench or hand type dial indicator gauge can be provided with an attachment of this type by pivotally connecting the arms 24 to a fixed portion of the gauge as shown in Fig. 6. In this type of gauge a dial indicator 32 is connected by suitable conventional means to the upper gauging point 19 while the lower gauging point 20 is fixedly carried by a rigid portion 33 of the device. By depressing an operating arm 34, operatively attached to the indicator 32, suitable mechanism (not shown) is operated to space the gauging points 19 and 20 to permit the lens 22 to be inserted therebetween, and the measurements are then made in the same manner as with the caliper type gauge. The resultant thickness measurement indications may then be taken from the dial indicator 32.

Figure 5:
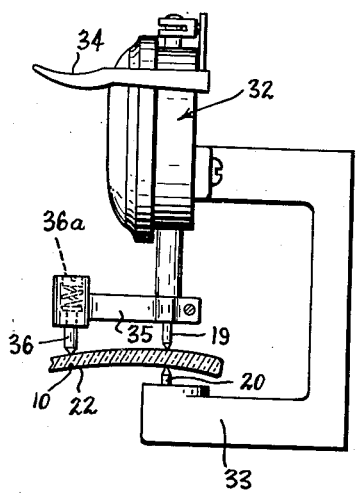
Fig. 5 is a side elevational view of a hand type dial indicator gauge embodying the invention.

In some cases, especially when measuring lenses having exceptionally thick portions, it may be desirable to use a device as illustrated in Fig. 5 wherein a horizontally extending arm 35 is fixedly attached to the upper movable gauging point 19 and carries a pin-like aligning member 36 which extends in a direction toward the lens parallel to the gauging point 19 and is normally yieldably urged toward the lens 22 by spring means 36a. The end of the aligning member 36 is pointed so that it may be easily positioned over the predetermined center marked 10 on the lens 22 and the distance between the center of the member 36 and the center of the gauging point 19 is predetermined so that the thickness measurements are made at controlled distances from the center 10.

It is to be understood that by providing the transparent member 28 with one reference mark 31 on its lower surface, this will cause the thickness measurement to be taken only at a distance from the predetermined center 10 of the lens corresponding to the distance between the reference mark 31 and the end of the gauging point 19, However, to provide means for taking measurements at various distances from the predetermined center of the lens, the transparent member 28 can be provided with a plurality of spaced reference marks 31, each of which will be located at a known distance from the end of the gauging point 19. Thus, by positioning the particular reference mark 31 over the marked center 10, the lens can be measured at a distance from the center corresponding to the distance from the particular mark 31 being used to the gauging point 19.

Figure 3:
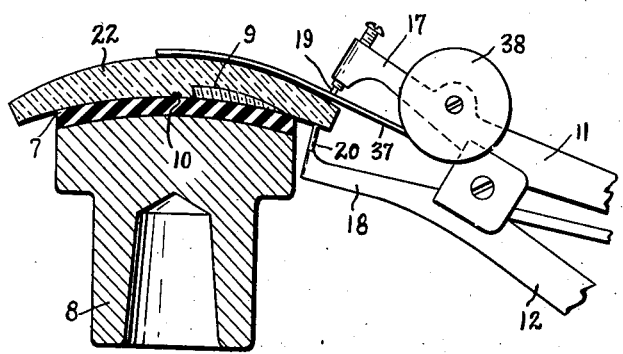
Fig. 3 is a fragmentary view similar to Fig. 1 and showing a modified form of the invention.
Figure 4:
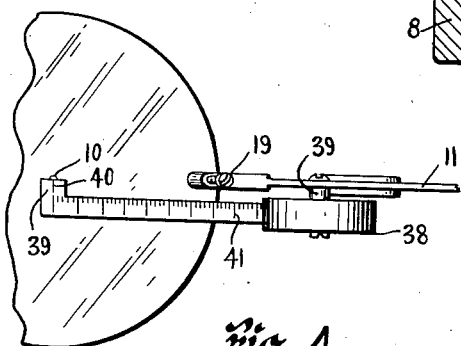
Fig. 4 is a top plan view of the device shown in Fig. 3.

To provide still further control of the distance between the lens center and the point of measurement in a caliper type gauge, the arm 11 (Figs. 3 and 4) can be provided with a tape measure 37 embodying ribbon-like spring material having a graduated scale 41 thereon. The tape measure 37 is preferably carried by a spring operated roll pivotally housed in a case 38 which is secured by means of a pin 39 or the like to the arm 11. The tape is adapted to be drawn outwardly of the case 38 in a direction toward the lens 22 into overlying relation therewith and is adapted to automatically and releasably lock in desired extended positions similar to known tape measures of this type that are in common commercial use. The tape is provided with an angled end portion 39, the end of which carries a reference mark 40 which can be aligned with the mark 10 on the lens indicating the predetermined center thereof. The scale 41 will indicate the extent to which the tape 37 is drawn out of the case 38 and thereby indicates as well the distance between the predetermined center indication 10 on the lens and the center of the gauging point 19.

Figure 7:
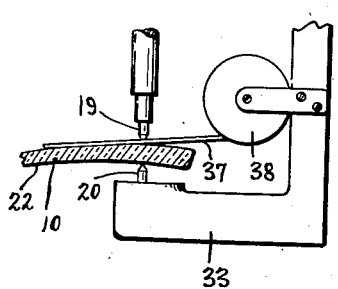
Figs. 7 and 8 are fragmentary side elevational and top plan views respectively of a hand type dial indicator gauge embodying a further modified form of the invention.
Figure 8:
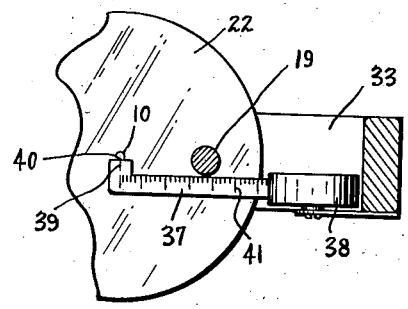

A dial indicator type gauge can also be provided with the same adjustable tape device merely by attaching the tape container to a fixed portion of the gauge as indicated in Figs. 7 and 8 whereupon the tape can be drawn outwardly of the case into overlying relation with the lens similarly to the tape used with the caliper type gauge. With this construction the gauging points 19 and 20 can be used to measure the thickness of the lens at any desired distance from the optical center 10 or other predetermined center of the lens.

From the foregoing it will be seen that means and methods have been provided for accomplishing all of the objects of this invention for controlling the point at which lens thickness measurements are taken with respect to a predetermined center thereof.

While certain novel features of the invention have been shown and described and are pointed out in the annexed claims, it will be understood that many various omissions, substitutions and changes in the formation and details of the device illustrated and in its operation may be made by those skilled in the art without departing from the spirit of the invention.

I claim:

1. A device for measuring the thickness of articles such as lenses comprising a gauge having gauging points adapted to engage the opposed side surfaces of the article, indicating means operable in response to the position of said gauging points for indicating the thickness of said article in accordance with the spacing between said gauging points when in engagement with the surfaces of said article, an arm-like member connected to said gauge and extending forwardly of the gauging points, and alignment means carried by said arm-like portion and positioned at a controlled distance from said gauging points to engage one of said surfaces in substantial coincidence with a predetermined point of the article for controlling the distance from said predetermined point at which said gauging points engage the surfaces of the article.

2. A device for measuring the thickness of articles such as lenses comprising a gauge having gauging points adapted for relative movement to engage the opposed side surfaces of the article, indicating means operable in response to the movement of said gauging points for indicating the thickness of said article in accordance with the spacing between said gauging points when in engagement with the surfaces of said article, a supporting member extending forwardly of the gauging points and pivotally connected to said gauge, and an alignment member carried by said supporting member and positioned to engage the surface of said article and at a controlled distance forwardly of said gauging points, said alignment member having a reference mark thereon adapted to be positioned in substantial coincidence with a predetermined point on said article whereby the distance from said predetermined point at which said gauging points engage the surfaces of the article may be controlled.

3. A device for measuring the thickness of articles such as lenses comprising a gauge having gauging points adapted to engage the opposed side surfaces of the article, indicating means operable in response to the position of said gauging points for indicating the thickness of said article in accordance with the spacing between said gauging points when in engagement with the surfaces of said article, a supporting member pivotally connected to said gauge, and a transparent alignment member pivotally carried by said supporting member and positioned at a controlled distance from said gauging points, said alignment member having a reference mark thereon for alignment with and superimposition over a predetermined point on said article for controlling the distance from said predetermined point at which said gauging points engage the surfaces of the article.

4. A device for measuring the thickness of articles such as lenses comprising a gauge having gauging points adapted to engage the opposed side surfaces of the article, indicating means operable in response to the position of said gauging points for indicating the thickness of said article in accordance with the spacing between said gauging points when in engagement with the surfaces of said article, supporting means connected to said gauge, and a flexible tape carried by and adapted to be moved into and out of said supporting means, said tape having a reference mark alignable with a predetermined point of said article for controlling the distance from said predetermined point at which said gauging points engage the surfaces of the article.

5. An attachment for a gauge used for measuring the thickness of articles such as lenses and having gauging points adapted to engage the opposed side surfaces of the article comprising an arm-like member attached to said gauge to extend forwardly of the gauging points and having a portion positioned at a controlled distance from said gauging points to engage on a surface of the article and having a reference mark thereon for positioning in substantial coincidence with a predetermined point of said article whereby the distance from said predetermined point at which said gauging points engage the surfaces of the article may be controlled.

6. A device for measuring the thickness of articles such as lenses comprising a gauge having gauging portions adapted to engage the opposed side surfaces of the article, an arm-like member connected to said gauge and extending forwardly of the gauging portions over a surface of the article to be measured, said arm-like member having a portion to overlie said surface adjacent an indicated point on said article and alignment means on said overlying portion located at a controlled distance from the gauging portions and arranged to substantially coincide with said point on the article whereby the distance of gauging from said point at different locations on said article will be substantially constant.

7. A device for measuring the thickness of articles such as lenses comprising a gauge having gauging points adapted to engage the opposed side surfaces of the article, an arm-like member connected to said gauge and extending forwardly of the gauging points to overlie a surface of the article to be measured, said arm-like member having a portion to engage said surface adjacent its center, resilient means normally urging said portion into said engagement and alignment means on said engaging portion located at a controlled distance from the gauging points and arranged to substantially coincide with the marked center of the article whereby the distance from the center of said article at which the thickness of the article to be measured may be controlled.

8. A device for measuring the thickness of articles such as lenses comprising a gauge having gauging points adapted to engage the opposed side surfaces of the article, an arm-like member having one end connected to said gauge and extending forwardly of the gauging points to overlie a surface of the article to be measured, said arm-like member having a transparent block pivotally connected to the opposed end thereof, resilient means urging said transparent block to engage said surface of the article, and alignment means on said transparent block and visible therethrough, said alignment means being located at a controlled distance from the gauging points and to substantially coincide with the marked center of the article whereby the distance from the center of said article at which the thickness of the article to be measured may be controlled.

MILTON R. THORBURN.

REFERENCES CITED

The following references are of record in the file of this patent:

UNITED STATES PATENTS

| Number | Name | Date |
| --- | --- | --- |
| 1,460,275 | Belanger et al. | June 26, 1923 |
| 1,953,498 | Pieri et al. | Apr. 3, 1934 |
| 2,387,852 | Maloff | Oct. 30, 1945 |

FOREIGN PATENTS

| Number | Country | Date |
| --- | --- | --- |
| 1,797 | Great Britain | Jan. 25, 1909 |